(No Model.)

G. H. SCHWEIGER.
VEHICLE STEP.

No. 452,198. Patented May 12, 1891.

Witnesses

Inventor
George H. Schweiger.
By his Attorneys Higdon & Higdon

UNITED STATES PATENT OFFICE.

GEORGE H. SCHWEIGER, OF ST. LOUIS, MISSOURI.

VEHICLE-STEP.

SPECIFICATION forming part of Letters Patent No. 452,198, dated May 12, 1891.

Application filed February 18, 1891. Serial No. 381,830. (No model.)

*To all whom it may concern:*

Be it known that I, GEORGE H. SCHWEIGER, of the city of St. Louis and State of Missouri, have invented certain new and useful Improvements in Vehicle-Steps, of which the following is a full, clear, and exact description, reference being had to the accompanying drawings, forming a part hereof.

My invention relates to improvements in vehicle-steps; and it consists in the novel arrangement and combination of parts, as will be more fully hereinafter described, and designated in the claim.

Figure 1:
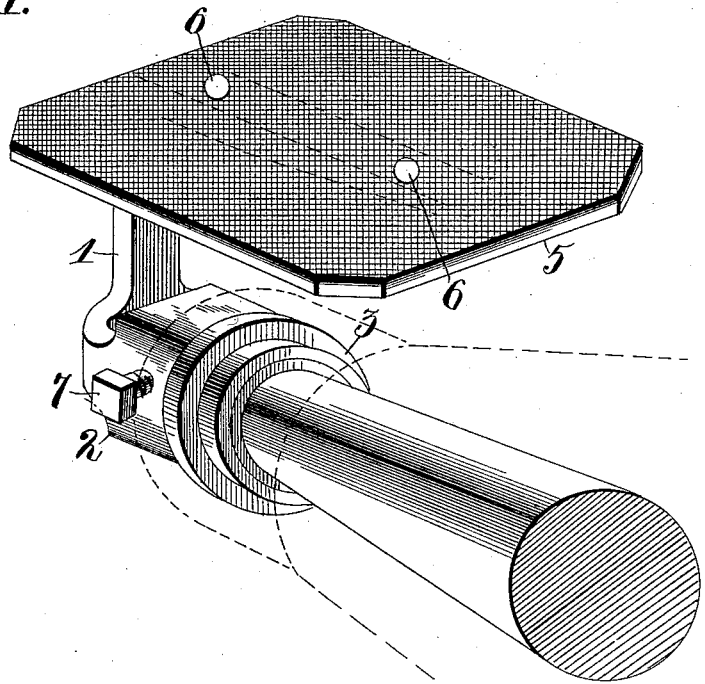
Figure 2:
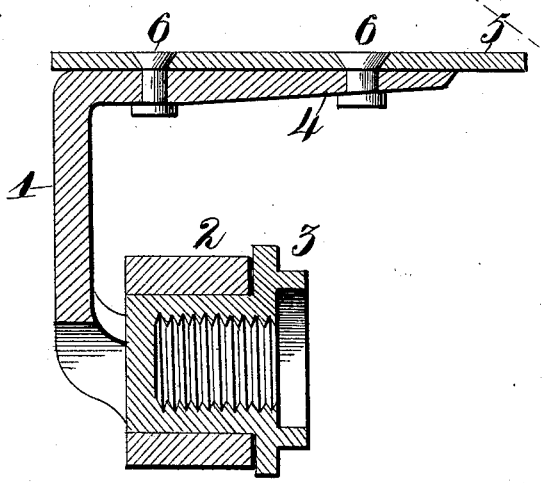

In the drawings, Figure 1 is a perspective view of my invention as applied to the axle of a vehicle, and Fig. 2 is a vertical longitudinal section of a modification of my invention.

The object of my invention is to construct a step for vehicles especially designed to be attached to the nut that goes on the fore wheels of vehicles, especially delivery and dairy wagons, &c., where it is necessary to climb out or in the vehicle over the front wheel; or the device is equally applicable to be attached to any vehicle.

Referring to the drawings, 1 indicates a shank, which is provided at one end with a square socket or perforation 2, which socket or perforation is adapted to fit snugly over the nut 3 of the axle. The opposite end of said shank is provided with a horizontal or approximately horizontal arm 4, to which is mechanically secured a plate 5. Said plate is provided with corrugations on its top surface to prevent the feet from slipping off. Said plate 5 is secured to arm 4 by means of rivets or bolts 6.

7 indicates a set-screw for rigidly securing the socket 2 of the shank on the nut; or, in place of using the said screw for said purpose, I may expand the socket by heat, and when thus expanded place it over the nut 2, and when it cools it will contract and be rigidly secured to said nut. When so secured it is equally useful as a wrench for screwing and unscrewing the nut from its appropriate axle.

When said device is rigidly and firmly secured on the nut, as hereinbefore stated, by a turning of the front wheel in toward the bed of the vehicle it will be in a suitable position or occupy about the same position as the ordinary step which is commonly secured to the bed of a vehicle.

In place of making the shank and socket formed thereon separate from the nut itself, I may cast them integrally or otherwise form them integrally; and I may, furthermore, form the horizontal arm and the plate, nut, and all integrally, as desired.

I am aware that prior to my invention steps have been carried on the axles of carriages and wagons by having a downwardly-extended plate which is secured to the forward face of the axle-nut by screws taking into the face thereof, and I do not therefore claim such a construction; but

What I claim is—

A step for vehicles, consisting of an angular socket 2, adapted to receive the nut upon the axle, a clamping-screw in the side of the said socket adapted to impinge upon the nut located therein, a shank and a horizontal arm 4, cast integral with the said socket, and a base-plate 5, secured to said horizontal arm, substantially as described.

In testimony whereof I affix my signature in presence of two witnesses.

GEORGE H. SCHWEIGER.

Witnesses:
 EDWARD EVERETT LONGAN,
 JNO. C. HIGDON.